United States Patent
Senoo

(10) Patent No.: US 8,009,225 B2
(45) Date of Patent: Aug. 30, 2011

(54) IMAGING APPARATUS HAVING AUTOMATIC EXPOSURE CONTROL UNIT

(75) Inventor: Isamu Senoo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1469 days.

(21) Appl. No.: 11/126,545

(22) Filed: May 11, 2005

(65) Prior Publication Data

US 2005/0259177 A1 Nov. 24, 2005

(30) Foreign Application Priority Data

May 18, 2004 (JP) .................................. 2004-147838

(51) Int. Cl.
*H04N 5/238* (2006.01)
*H04N 3/14* (2006.01)
(52) U.S. Cl. ...................... 348/364; 348/222.1; 348/296
(58) Field of Classification Search .......... 348/362–366, 348/297, 296
See application file for complete search history.

(56) References Cited

U.S. PATENT DOCUMENTS

| | | | | | |
|---|---|---|---|---|---|
| 5,128,769 | A | * | 7/1992 | Arai et al. ..................... | 348/363 |
| 5,299,015 | A | * | 3/1994 | Imaide et al. ............... | 348/229.1 |
| 5,986,705 | A | * | 11/1999 | Shibuya et al. ............... | 348/362 |
| 6,836,288 | B1 | * | 12/2004 | Lewis ......................... | 348/229.1 |
| 6,930,723 | B1 | * | 8/2005 | Tsuda et al. .................. | 348/363 |
| 2010/0097493 | A1 | * | 4/2010 | Asoma ........................ | 348/229.1 |

FOREIGN PATENT DOCUMENTS

JP 2000-41178 A 2/2000

* cited by examiner

*Primary Examiner* — Ngoc-Yen T Vu
(74) *Attorney, Agent, or Firm* — Canon U.S.A., Inc. I.P. Division

(57) ABSTRACT

An imaging apparatus includes an automatic exposure control unit that changes an exposure value based on luminance detected by a luminance detection unit for detecting luminance of an imaging screen, and a luminance changing amount detection unit that detects a luminance changing amount in the imaging screen. A method of setting an exposure value is changed between when the luminance changing amount detected by the luminance changing amount detection unit exceeds a preset luminance changing amount and when the luminance changing amount does not exceed the preset luminance changing amount.

8 Claims, 7 Drawing Sheets

FIG.6

|  | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| 1ST LINE | ░ |  |  |  |  |  |  |  |  |  |  |  |  |  |  | ░ |
| 2ND LINE | ░ |  |  |  |  |  |  |  |  |  |  |  |  |  |  | ░ |
| 3RD LINE | ░ |  |  |  |  |  |  |  |  |  |  |  |  |  |  | ░ |
| 4TH LINE | ░ |  |  |  |  |  |  |  |  |  |  |  |  |  |  | ░ |
| 5TH LINE | ░ |  |  |  |  |  |  |  |  |  |  |  |  |  |  | ░ |
| 6TH LINE | ░ |  |  |  |  |  |  |  |  |  |  |  |  |  |  | ░ |
| 7TH LINE | ░ |  |  |  |  |  |  |  |  |  |  |  |  |  |  | ░ |
| 8TH LINE | ░ |  |  |  |  |  |  |  |  |  |  |  |  |  |  | ░ |

(Columns: 1ST COLUMN through 16TH COLUMN)

FIG.7

|  | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| 1ST LINE | C | C | C | C | C | C | C | C | C | C | C | C | C | C | C | C |
| 2ND LINE | C | C | C | C | C | C | B | B | B | B | C | C | C | C | C | C |
| 3RD LINE | C | C | C | C | B | B | B | B | B | B | B | C | C | C | C | C |
| 4TH LINE | C | C | C | B | B | B | A | A | A | A | B | B | B | C | C | C |
| 5TH LINE | C | C | C | B | B | B | A | A | A | A | B | B | C | C | C | C |
| 6TH LINE | C | C | C | C | B | B | B | B | B | B | B | C | C | C | C | C |
| 7TH LINE | C | C | C | C | C | B | B | B | B | C | C | C | C | C | C | C |
| 8TH LINE | C | C | C | C | C | C | C | C | C | C | C | C | C | C | C | C |

(Columns: 1ST COLUMN through 16TH COLUMN)

FIG.8

|  | 1st col | 2nd col | 3rd col | 4th col | 5th col | 6th col | 7th col | 8th col | 9th col | 10th col | 11th col | 12th col | 13th col | 14th col | 15th col | 16th col |
|---|---|---|---|---|---|---|---|---|---|---|---|---|---|---|---|---|
| 1ST LINE | C | C | C | C | C | C | C | C | C | C | C | C | C | C | C | C |
| 2ND LINE | C | C | C | C | C | C | B | B | B | B | C | C | C | C | C | C |
| 3RD LINE | C | C | C | C | C | C | B | B | B | B | B | B | C | C | C | C |
| 4TH LINE | C | C | C | B | C | C | A | A | A | A | B | B | B | C | C | C |
| 5TH LINE | C | C | C | B | C | C | A | A | A | A | B | B | B | C | C | C |
| 6TH LINE | C | C | C | C | C | C | B | B | B | B | B | B | C | C | C | C |
| 7TH LINE | C | C | C | C | C | C | B | B | B | B | C | C | C | C | C | C |
| 8TH LINE | C | C | C | C | C | C | C | C | C | C | C | C | C | C | C | C |

IMAGING APPARATUS HAVING AUTOMATIC EXPOSURE CONTROL UNIT

BACKGROUND OF THE INVENTION

1. Field of the Invention

The present invention relates to an automatic exposure control function in an imaging apparatus such as a digital camera or a digital video camera.

2. Description of the Related Art

In an imaging apparatus such as a digital camera or a digital video camera, control is performed by adjusting a diaphragm value, a shutter speed, an imaging sensitivity or the like to automatically set proper exposure. As long as there is no special instruction such as AE locking for intentionally fixing an exposure value, automatic exposure control is operated to always set exposure to a proper value.

For example, in Japanese Patent Application Laid-Open No. 2000-41178, to properly perform automatic exposure control, any one of average light metering, center-weighted light metering, spot light metering, multipattern light metering (split light metering or evaluative light metering) and the like is selected.

Automatic exposure control is generally performed based on luminance obtained from image information at the time of photographing. When an object having luminance greatly different from current luminance, that is, an object of extremely high or low luminance, passes through an imaging area during photographing, the automatic exposure control is temporarily affected by the object which entered the area. In other words, an exposure control state is changed while the object of different luminance passes through the photographing area. After the object of the different luminance level passes through the photographing area, the original exposure control state is restored. However, a photographed image is poor to see.

For example, in the case of performing light metering by weighting each divided area to make proper exposure of an area in which a main object is assumed to be present, when a target of extremely high or low luminance passes through an area of a large weight in a photographing screen, it temporarily causes an extreme change in exposure value.

Entry of an object in an image which a photographer does not desire, or crossing of a human or a car between an object and a camera often occurs during photographing. If automatic exposure control is accordingly triggered, exposure may be improperly controlled. Thus, there is still room for improvement.

SUMMARY OF THE INVENTION

The present invention has been made in consideration of the above situation. The present invention performs proper exposure control even when an object of extremely high or low luminance unexpectedly passes through an imaging screen.

According to an aspect of the present invention, an imaging apparatus includes a luminance detection unit adapted to detect luminance of an imaging screen, an automatic exposure control unit adapted to change an exposure value based on the luminance detected by the luminance detection unit, and a luminance changing amount detection unit adapted to detect an amount of luminance change in the imaging screen. The automatic exposure control unit is adapted to change a method of setting an exposure value between when the luminance changing amount detected by the luminance changing amount detection unit exceeds a preset luminance changing amount and when the luminance changing amount does not exceed the preset luminance changing amount.

According to another aspect of the present invention, an exposure control method of an imaging apparatus includes a luminance detection step of detecting luminance of an imaging screen, an exposure value changing step of changing an exposure value based on the luminance detected by the luminance detection step, a luminance changing amount detection step of detecting a luminance changing amount in the imaging screen, and a step of changing a method of setting an exposure value between when the luminance changing amount detected by the luminance changing amount detection step exceeds a preset luminance changing amount and when the luminance changing amount does not exceed the preset luminance changing amount.

According to another aspect of the present invention, a program executes the exposure control method.

According to the still another aspect of the present invention, a control apparatus of an imaging apparatus includes a controller that causes a luminance detection unit to detect luminance of an imaging screen, a luminance changing amount detection unit to detect a luminance changing amount in the imaging screen, and an automatic exposure control unit to change a method of changing an exposure value between when the luminance changing amount detected by the luminance changing amount detection unit exceeds a preset luminance changing amount and when the luminance changing amount does not exceed the preset luminance changing amount.

According to yet another aspect of the present invention, an imaging apparatus includes a luminance detection unit adapted to detect luminance of an imaging screen, an automatic exposure control unit adapted to change an exposure value based on the luminance detected by the luminance detection unit, and a luminance changing amount detection unit adapted to detect a luminance changing amount in the imaging screen. The automatic exposure control unit is adapted to fix the exposure value when the luminance changing amount detected by the luminance changing amount detection unit exceeds a preset luminance changing amount.

According to yet another aspect of the present invention, an imaging apparatus includes a luminance detection unit adapted to detect luminance of an imaging screen, an automatic exposure control unit adapted to change an exposure value based on the luminance detected by the luminance detection unit, and an exposure changing amount detection unit adapted to detect an exposure amount changed by the automatic exposure control unit. The automatic exposure control unit is adapted to fix the exposure value when the exposure changing amount detected by the exposure changing amount detection unit exceeds a preset exposure changing amount.

According to still another aspect of the present invention, an imaging apparatus includes a luminance detection unit adapted to detect luminance of an imaging screen, an automatic exposure control unit adapted to change an exposure value based on the luminance detected by the luminance detection unit, and a luminance changing amount detection unit adapted to detect a luminance changing amount in the imaging screen. The automatic exposure control unit is adapted to put a limit on a changing amount of the exposure value when the luminance changing amount detected by the luminance changing amount detection unit exceeds a preset luminance changing amount.

According to still another aspect of the present invention, an imaging apparatus includes a luminance detection unit adapted to detect luminance of each divided area of an imaging screen divided into a plurality of areas, an automatic exposure control unit adapted to change an exposure state by giving a first weight to the luminance of each area detected by the luminance detection unit, and a luminance changing amount detection unit adapted to detect a luminance changing amount of each area in the imaging screen. The automatic exposure control unit is adapted to change the exposure value by giving a second weight different from the first weight to the luminance of each area for at least a predetermined time when the luminance changing amount detected by the luminance changing amount detection unit exceeds a preset luminance changing amount in a predetermined area.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing an example of divided areas for determining whether a luminance changing amount is equal to/more than a predetermined value.

FIG. 7 is a diagram showing a weighting ratio before weighting is changed according to a fourth embodiment.

FIG. 8 is a diagram showing a weighting ratio after weighting is changed according to the fourth embodiment.

DETAILED DESCRIPTION OF THE EMBODIMENTS

Embodiments of the invention will be described in detail below with reference to the drawings.

Sizes, shapes and relative arrangements of divided areas illustrated in the embodiments should properly be changed in accordance with apparatus and various conditions to which the present invention is applied. The invention is not limited to the examples.

First Embodiment

Figure 1:
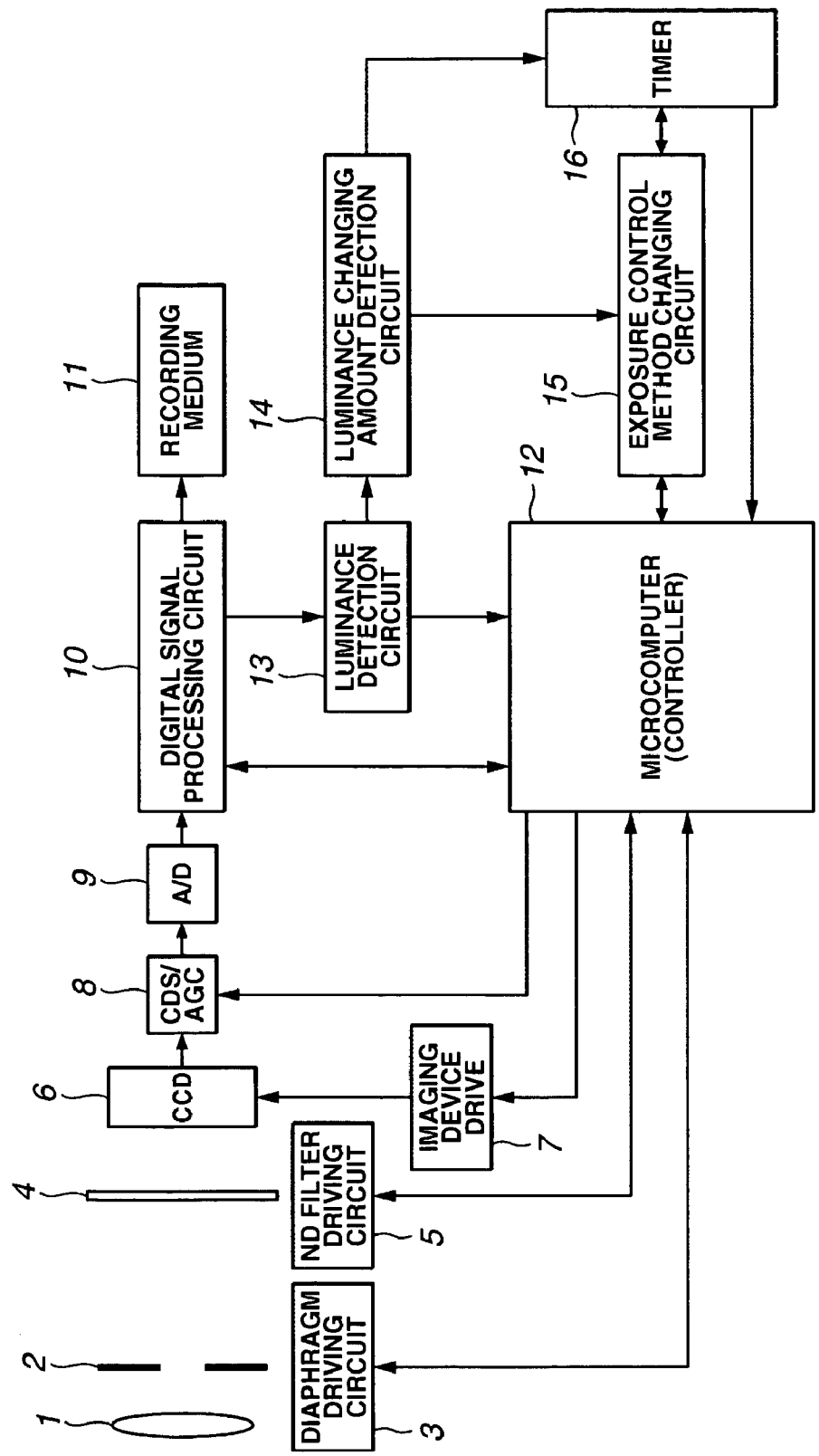
FIG. 1 is a diagram of an imaging apparatus according to a first embodiment of the present invention.

FIG. 1 shows an example diagram of a main portion of an imaging apparatus according to a first embodiment of the present invention. The imaging apparatus shown in FIG. 1 includes an imaging lens 1 (only one is shown for simplicity), a diaphragm (aperture stop) 2, a diaphragm driving circuit 3 for driving the diaphragm 2 and detecting a driven state thereof, a neutral density (ND) filter 4, and an ND filter driving circuit 5 for driving the ND filter 4 and detecting a driven state thereof. The imaging apparatus shown in FIG. 1 also includes a charge-coupled device (CCD) 6 which is a solid-state image sensing device having a photoelectric conversion function, and an imaging device drive 7 which supplies a driving pulse for driving the CCD 6. The solid-state image sensing device is not limited to the CCD, but a complementary metal-oxide semiconductor (CMOS) may be used. A correlated double sampling (CDS)/auto gain control (AGC) circuit 8 is used for sampling and amplifying charges of image information stored in the CCD 6.

An A/D converter 9 converts an output of the CDS/AGC circuit 8 into digital data. A digital signal processing circuit 10 processes the signal converted into the digital data. The processed digital data is recorded on a recording medium 11. The imaging apparatus shown in FIG. 1 further includes a microcomputer 12, a luminance detection circuit 13 for detecting luminance of an imaging screen from an output of the digital signal processing circuit 10, and a luminance changing amount detection circuit 14 for detecting a luminance changing amount (size of a luminance change per unit time). An exposure control method changing circuit 15 is used for switching between automatic exposure control for automatically controlling an exposure value and fixed exposure control for fixing the exposure value in accordance with an output of the luminance changing amount detection circuit 14, and a timer 16 for measuring an operation time of the exposure control method changing circuit 15.

With the aforementioned configuration, charges stored in the CCD 6 in accordance with a beam of light from an object are sampled and amplified by the CDS/AGC circuit 8. An output of this CDS/AGC circuit 8 is converted into digital data by the A/D converter 9, and sent to the digital signal processing circuit 10.

When automatic exposure control is set by the exposure control method changing circuit 15, the digital signal processing circuit 10 extracts a luminance component of the object, and the luminance detection circuit 13 performs light metering to obtain luminance of the object. The microcomputer 12 controls the diaphragm driving circuit 3, the ND filter driving circuit 5, and the imaging device drive 7 based on the luminance to obtain an image signal of a proper exposure value. A light metering method, any one of average light metering, center-weighted light metering, multipattern light metering (split light metering or evaluative light metering) and the like can be used. Here, explanation will be made by taking an example of the multipattern light metering.

A feature of the first embodiment is that the imaging apparatus includes the luminance changing amount detection circuit 14 and the exposure control method changing circuit 15.

The luminance changing amount detection circuit 14 detects a luminance changing amount of each divided area, and outputs a signal for fixing an exposure value to the exposure control method changing circuit 15 when it detects that a luminance changing amount becomes equal to/more than a predetermined amount in a predetermined divided area.

Next, exposure control of the imaging apparatus of the embodiment will be described by referring to a flowchart of FIG. 2.

When power is turned ON, the imaging apparatus performs a predetermined operation such as initial setting, and starts exposure control which is started from step S10.

In step S11, the luminance detection circuit 13 measures a luminance value of an imaging screen (light metering).

In step S12, the luminance changing amount detection circuit 14 determines whether a luminance changing amount is equal to/more than a predetermined value in any one of divided areas located in left and right ends or upper-and-lower and left-and-right ends of the imaging screen as shown in FIG. 6. The predetermined value here is set to a value which makes a user feel an unnatural exposure change when a proper exposure value must be changed more times than predetermined stages in the automatic exposure control.

If the luminance changing amount is equal to/more than the predetermined value, processing proceeds to step S13 and the luminance changing amount detection circuit 14 outputs a signal to the exposure control method changing circuit 15 and the timer 16. If the luminance changing amount is not equal to/more than the predetermined value, processing returns to step S11.

The target of the luminance changing amount detection is limited to the divided area located in the end of the imaging screen because in most cases unexpected objects enter from the ends of the screen. According to the first embodiment, it is enough for the luminance changing amount detection circuit 14 to detect only the luminance changing amount of the divided area located in the end of the screen, and thus a time necessary for processing can be shortened. The divided area for the luminance changing amount detection is not limited to the above, and a configuration may be also employed, in which luminance changing amounts of all the divided areas are detected.

In step S13, the exposure control method changing circuit 15 issues a command to the microcomputer 12 to cancel the automatic exposure control and to fix the exposure value to the value which has been set. The fixing of the exposure value means inhibition of changes of parameters, i.e., a diaphragm value, a shutter speed, and an imaging sensitivity, which affect the exposure value. In synchronization with this, the timer 16 starts measurement of a time for fixing the exposure value. The microcomputer 12 continues fixing the exposure value until a predetermined time T1 passes, and the process proceeds to step S14. The predetermined time T1 is set to about one to several seconds of several tens of minutes to match a speed at which a human or an object crosses the screen.

In step S14, while the exposure value is fixed for the predetermined time T1, the luminance changing amount detection circuit 14 determines one of the predetermined divided areas in which the luminance changing amount is equal to/more than the predetermined value. The predetermined divided areas in step S14 are divided areas adjacent to a divided area in which a luminance changing amount equal to/more than the predetermined value has been detected immediately before, and divided areas in which the luminance changing amounts are monitored in step S12.

For example, in step S12, the luminance changing amount detection circuit 14 monitors the occurrence of luminance changing amounts equal to/more than the predetermined value at 1st and 16th columns shown in FIG. 6. If the luminance changing amount equal to/more than the predetermined value is detected at the 1st column, in the step S14, a luminance changing amount at a 2nd column is monitored in addition to the monitoring at the 1st and 16th columns. If the luminance changing amount equal to/more than the predetermined value is detected at the 2nd column, a luminance changing amount at a 3rd column is monitored in addition to the monitoring at the 1st and 16th columns when the process comes to step S14 again. Then, if the luminance changing amount equal to/more than the predetermined value is detected at the 3rd column, luminance changing amounts are monitored at 2nd and 4th columns in addition to the monitoring at the 1st and 16th columns when the process comes to step S14 again.

The divided areas for the luminance changing amount detection by the luminance changing amount detection circuit 14 are not limited to the above in step S14. For example, targets may be all divided areas located by a predetermined distance from the divided area in which the luminance changing amount equal to/more than the predetermined value has been detected, or luminance changing amounts of all the divided areas in the imaging screen may be detected.

In step S14, in the predetermined divided areas within the predetermined time, the luminance changing amount detection circuit 14 monitors the luminance changing amount at the 2nd column in addition to those at the 1st and 16th columns. When the luminance changing amount detection circuit 14 detects a luminance change equal to/more than the predetermined value at any one of the 1st, 16th and 2nd columns, in step S15, the timer 16 is reset. Processing then returns to step S13 and the exposure value is fixed again for the predetermined time T1, and the luminance changing amount detection unit 14 performs the same determination again in step S14.

If no luminance changing amount equal to/more than the predetermined value is detected in any one of the monitored divided areas in step S14, the process proceeds to step S16.

In step S16, the exposure control method changing circuit 15 issues a command to the microcomputer 12 to release the fixing of the exposure value and to resume the automatic exposure control. Accordingly, the automatic exposure control is started again. Processing then proceeds to step S17.

That is, in steps S14 and S15, detection is made as to movement of an unexpected object having extreme luminance. As long as the object moves, steps S14 and S15 are repeated to maintain the exposure value fixed.

When the luminance changing amount is no longer equal to/more than the predetermined value in any one of the predetermined divided areas, in step S14 it is determined that the object has exited from the imaging screen or stopped in the imaging screen. Then, the process proceeds to step S16 to resume the automatic exposure control.

Here, the exposure control method changing circuit 15 resumes the automatic exposure control not only when the unexpected objects exits from the imaging screen but also when it stops, because if the object stops, the object is regarded as an object intended by the user. If an object unintended by the user stops in the imaging screen, the photographer may possibly take some countermeasures such as changing of an angle of the imaging screen or switching to spot light metering.

For the predetermined time T1 in step S14, a time obtained by experiment may be set, or a moving speed obtained by image processing when the object enters the imaging screen may be converted to a value which may be set as T1.

In step S17, the microcomputer 12 determines setting of a proper exposure value by the automatic exposure control. If the proper exposure value has been set, the process returns to step S11, or if not, the process proceeds to step S18.

In step S18, to set a proper exposure value, light metering is performed by the luminance detection circuit 13, the microcomputer 12 performs automatic exposure control, and then the process returns to step S17.

The process stands by until the proper exposure value is set in step S17 because an exposure value can greatly change immediately after the exposure value fixing is released in step S16. Accordingly, if the process immediately returns to steps S11 and S12 from step S16, it is feared that the luminance changing amount detection circuit 14 will determine that a luminance changing amount is equal to/more than the predetermined value in step S12 due to the great change of the exposure value.

Thus, according to the first embodiment, even when the object that greatly affects the exposure value passes through the imaging screen, it is possible to perform proper exposure control by preventing the influence of the object on the exposure value.

In the foregoing, the luminance changing amount detection by the luminance changing amount detection circuit 14 is carried out in partial divided areas in steps S12 and S14. However, a configuration may be employed in which luminance changing amount detection is always carried out for all the divided areas in the imaging screen.

Furthermore, instead of detecting a luminance changing amount for each divided area, a configuration may be employed in which the exposure value is fixed only for the predetermined time T1 when a correction amount of the exposure value obtained as a result of multipattern light metering for the entire imaging screen is equal to/more than a predetermined value.

Second Embodiment

Exposure control of an imaging apparatus according to a second embodiment of the present invention will be described by referring to the flowchart of FIG. 3. Same step numbers as those of FIG. 2 are allocated to the same steps as those of the first embodiment and descriptions thereof are not repeated here.

Figure 2:
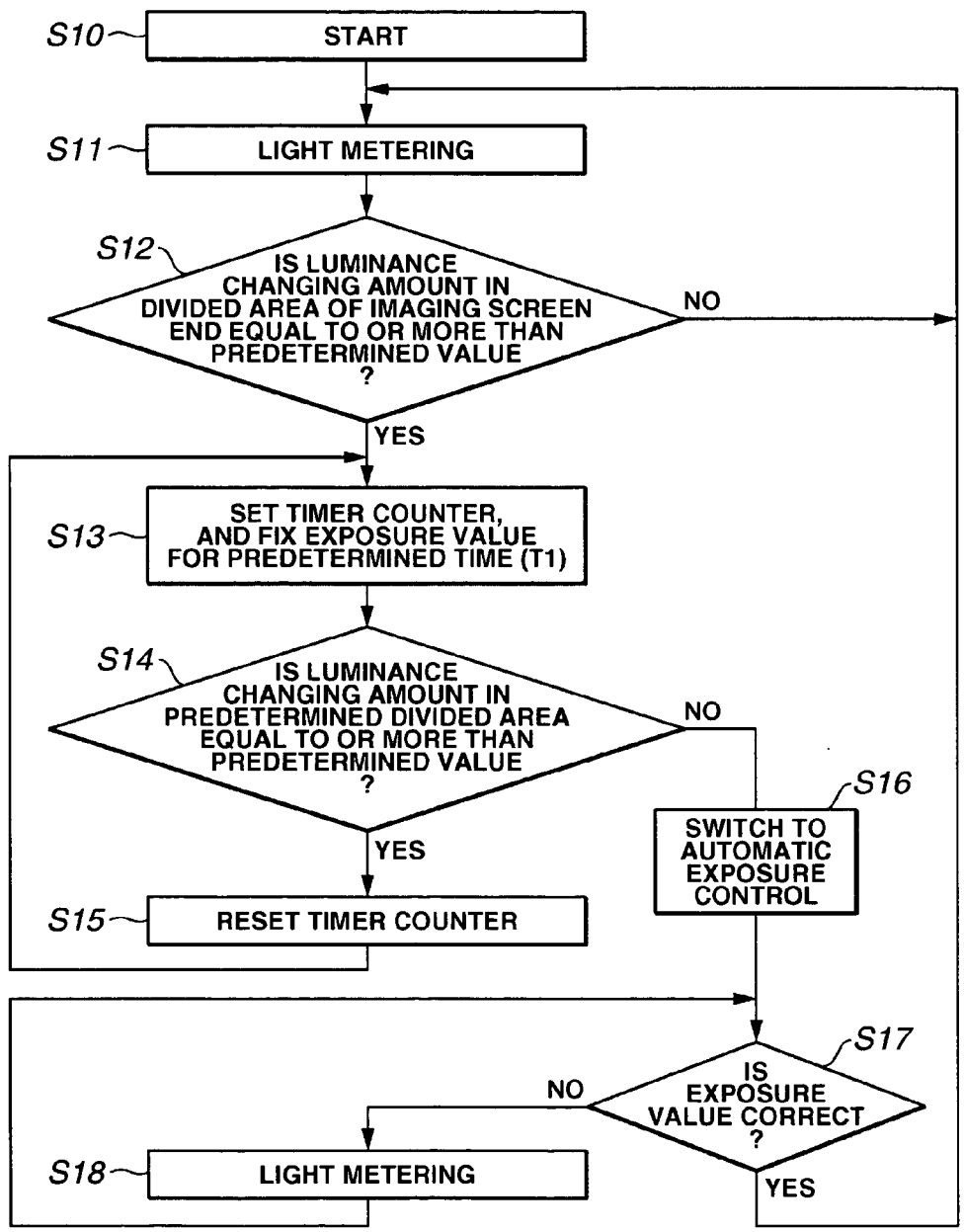
FIG. 2 is a flowchart of exposure control of the imaging apparatus according to the first embodiment.
Figure 3:
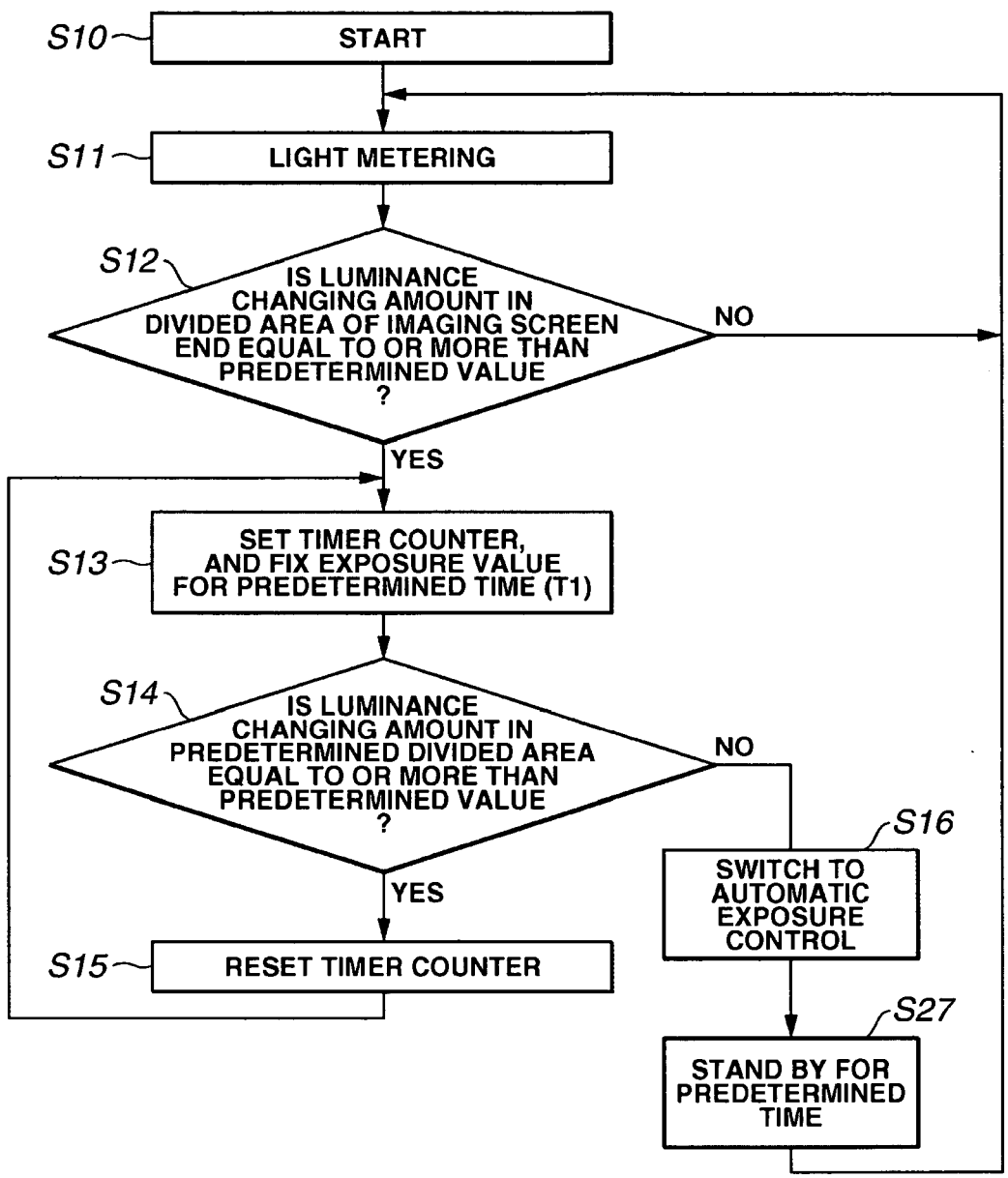
FIG. 3 is a flowchart of exposure control of an imaging apparatus according to a second embodiment of the present invention.

According to the second embodiment, if luminance change equal to/more than a predetermined value is not detected in a specific divided area in step S14, after switching to automatic exposure control in step S16, a process (step S27) that is different from that of FIG. 2 is performed. This process is described next.

According to this embodiment, if a luminance change equal to/more than the predetermined value is not detected in a predetermined divided area in step S14, an exposure control method changing circuit 15 issues a command to a microcomputer 12 in step S16 to release fixing of an exposure value and to switch to automatic exposure control. The process stands by for a predetermined time in step S27, and then returns to step S11.

For the predetermined time in step S27, a sufficient time is set to obtain a proper exposure value by the automatic exposure control. According to the second embodiment, it is not necessary to determine a return of the exposure value to a proper level as done in step S17 of the first embodiment (FIG. 2).

Third Embodiment

Figure 4:
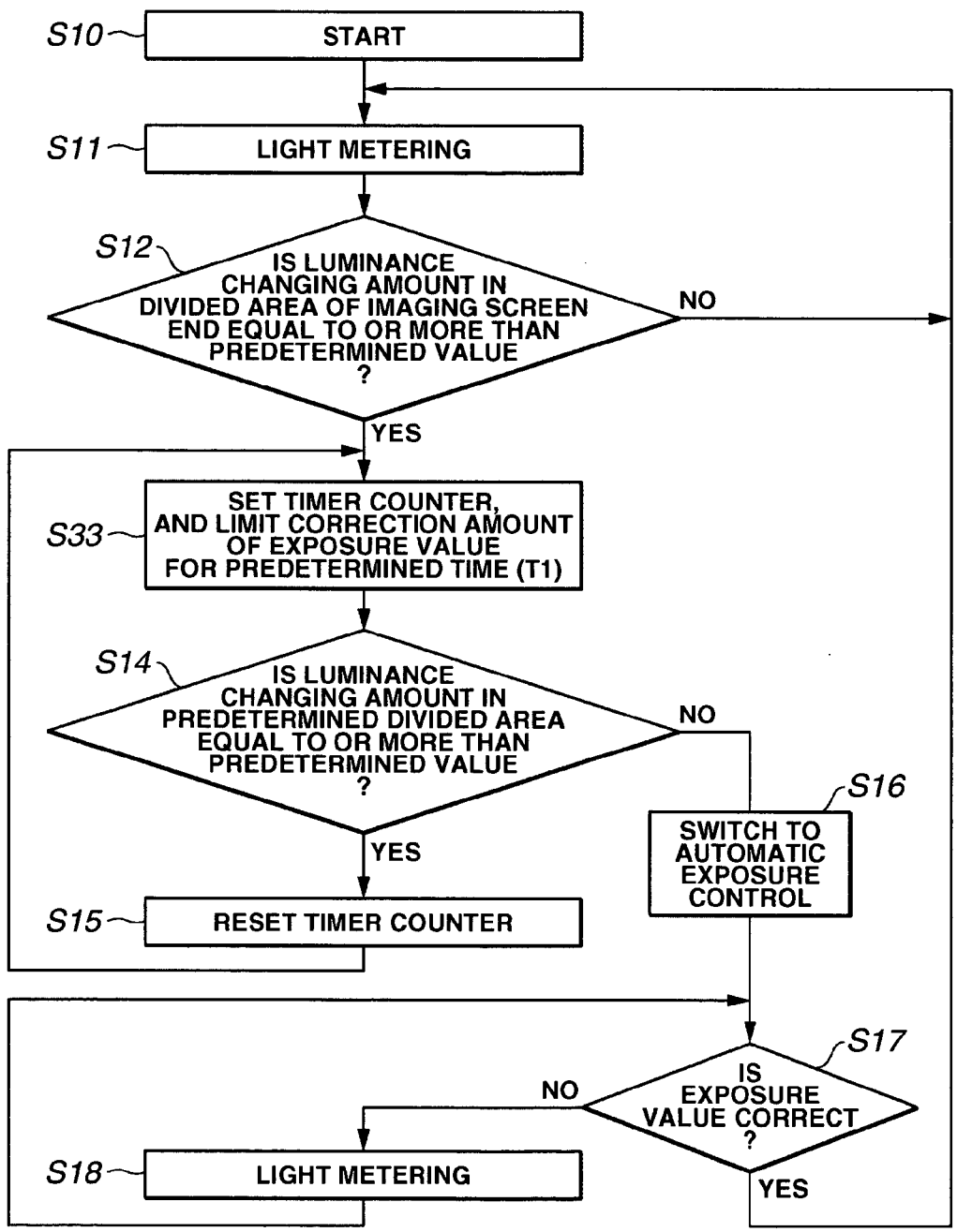
FIG. 4 is a flowchart of exposure control of an imaging apparatus according to a third embodiment of the present invention.

Exposure control of an imaging apparatus according to a third embodiment of the present invention will be described by referring to the flowchart of FIG. 4. Same step numbers as those of FIG. 2 are allocated to the same steps as those of the first embodiment and descriptions thereof are not repeated here.

According to the third embodiment, a process (step S33) which is taken immediately after a luminance changing amount in any one of divided areas located at an end of an imaging screen turns equal to/more than a predetermined value in step S12 is different from that of FIG. 2. This process is described next.

According to the third embodiment, if a luminance changing amount in any one of divided areas located at the ends of the imaging screen is equal to/more than the predetermined value in step S12, in a subsequent step S33, a microcomputer 12 performs automatic exposure control for a predetermined time T1 while putting a limit on a changing amount of an exposure value only, and then proceeds to step S14.

The "limit on the changing amount of the exposure value" means a range in which an obtained image causes no visually uncomfortable feeling. Specifically, control which causes an uncomfortable feeling means a change of 1 to 2 steps or more in each control of a diaphragm value, a shutter speed, and an imaging sensitivity, for example, $\frac{1}{60}$ to $\frac{1}{100}$ or $\frac{1}{60}$ to $\frac{1}{180}$ in the case of the shutter speed.

According to the third embodiment, even if an object that greatly affects the exposure value stays in the imaging screen, it is possible to set the exposure value to a proper state more quickly that the first embodiment when the exposure value is switched from the fixed state to the automatic exposure control.

Fourth Embodiment

Figure 5:
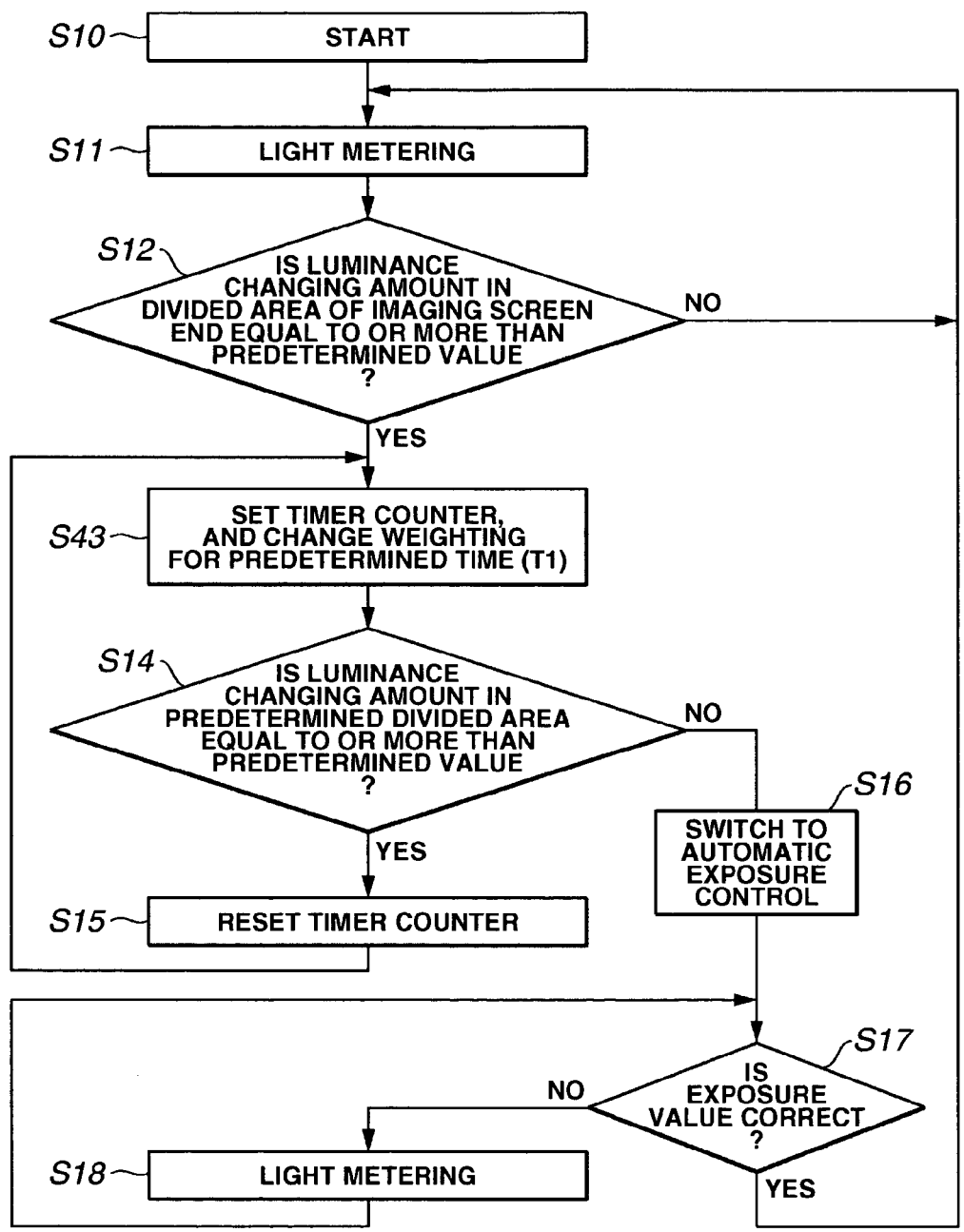
FIG. 5 is a flowchart of exposure control of an imaging apparatus according to a fourth embodiment of the present invention.

Exposure control of an imaging apparatus according to a fourth embodiment of the present invention will be described by referring to the flowchart of FIG. 5. Same step numbers as those of FIG. 2 are allocated to the same steps as those of the first embodiment and descriptions thereof are not repeated here.

According to the fourth embodiment, a process (step S43) which is taken immediately after a luminance changing amount in any one of divided areas located at ends of an imaging screen turns equal to/more than a predetermined value in step S12 is different from that of FIG. 2. This process is described next.

FIG. 7 shows an example of weighting according to the fourth embodiment before the weighting is changed, and FIG. 8 shows an example of weighting according to the fourth embodiment after weighting is changed. A, B and C in divided areas of FIGS. 7 and 8 denote weighting ratios, and A>B>C is assumed.

According to the fourth embodiment, if it is determined in step S12 that a luminance changing amount is equal to/more than a predetermined value, in step S43 a microcomputer 12 changes a weight of a light metering value used for calculating a proper value of automatic exposure control during a predetermined time T1. Specifically, first a light metering value of each divided area is obtained, and then an exposure value is calculated by giving a weight to the light metering value. In this case, an exposure control value is calculated by setting to zero a weighting ratio of columns in the divided areas which agree with determining conditions of step S12 or step S14 or in the divided areas which agree with the determining conditions or by reducing the weighting ratio as shown in FIG. 8.

Accordingly, effects similar to those of the first to third embodiments can be obtained.

According to the first to fourth embodiments, the luminance changing amount is used as a criterion in steps S12 and S14. However, a change of an exposure amount may also be chosen as a criterion.

Additionally, in steps S13, S33 and S43, if a luminance change equal to/more than the predetermined value is detected again before the predetermined time T1 passes, exposure may be fixed again from the time when the luminance change equal to/more than the predetermined value or more is detected.

The present invention is also carried out by providing a storage medium (or recording medium), on which software program code for realizing the functions of the embodiments are stored, to an imaging apparatus or to an imaging system capable of controlling the imaging apparatus through communication in which the computer of the imaging system or the microcomputer of the imaging apparatus reads and executes the program code stored on the storage medium. In this case, the program code read from the storage medium realizes the functions of the embodiments themselves. In the above case the functions of the embodiments are realized not only by executing the program code read by the computer but also an operating system (OS) or the like operated on the computer of the imaging system may perform a part or all actual processing based on commands of the program code.

Furthermore, in other case the program code read from the storage medium is written in a memory disposed in a function expansion card inserted into the imaging system or the imaging apparatus, or in a function expansion unit connected to the computer of the imaging system or the microcomputer of the imaging apparatus, in which a CPU disposed in the function expansion card or the function expansion unit performs a part or all actual processing based on the commands of the program code.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-147838 filed May 18, 2004, which is hereby incorporated by reference herein.

What is claimed is:

1. An imaging apparatus comprising:
   a luminance detection unit adapted to detect luminance of an object;
   an automatic exposure control unit adapted to change at least one of exposure parameters based on a luminance amount detected by the luminance detection unit; and
   a luminance changing amount detection unit adapted to detect a luminance changing amount based on the luminance amount detected by the luminance detection unit,
   wherein the automatic exposure control unit is adapted to inhibit change of the exposure parameters when the luminance changing amount detected by the luminance changing amount detection unit exceeds a preset luminance changing amount and to release the inhibition of change of the exposure parameters when a predetermined time passes after the inhibition of change of the exposure parameters starts.

2. An imaging apparatus according to claim 1, wherein the automatic exposure control unit is adapted to release the inhibition of change of the exposure parameters when the luminance changing amount detected by the luminance changing amount detection unit does not exceed the preset luminance changing amount before the predetermined time passes after the inhibition of change of the exposure parameters starts.

3. An imaging apparatus according to claim 1, wherein the automatic exposure control unit is adapted to maintain the inhibition of change of the exposure parameters when the luminance changing amount detected by the luminance changing amount detection unit exceeds the preset luminance changing amount before the predetermined time passes after the inhibition of change of the exposure parameters starts.

4. An imaging apparatus according to claim 1,
   wherein the luminance detection unit is adapted to detect the luminance in each of a plurality of areas, and the automatic exposure control unit is adapted to inhibit change of the exposure parameters when the luminance changing amount detected by the luminance changing amount detection unit exceeds the preset luminance changing amount in a predetermined area.

5. An imaging apparatus according to claim 4,
   wherein the predetermined area is an area located in an end of an imaging screen.

6. An imaging apparatus comprising:
   a luminance detection unit adapted to detect luminance of an object;
   an automatic exposure control unit adapted to change at least one of exposure parameters based on the luminance detected by the luminance detection unit; and
   an exposure changing amount detection unit adapted to detect an exposure amount changed by the automatic exposure control unit,
   wherein the automatic exposure control unit is adapted to inhibit change of the exposure parameters when the exposure changing amount detected by the exposure changing amount detection unit exceeds a preset exposure changing amount and to release the inhibition of change of the exposure parameters when a predetermined time passes after the inhibition of change of the exposure parameters starts.

7. An exposure control method of an imaging apparatus, comprising:
   a luminance detection step of detecting luminance of an object;
   an exposure value changing step of changing at least one of exposure parameters based on the luminance detected by the luminance detection step;
   an exposure changing amount detection step of detecting an exposure amount changed by an automatic exposure control unit;
   a step of inhibiting change of the exposure parameters when the exposure changing amount detected by the exposure changing amount detection step exceeds a preset exposure changing amount; and
   a step of releasing the inhibition of change of the exposure parameters when a predetermined time passes after the fixing of the inhibition of change of the exposure parameters starts.

8. An exposure control method of an imaging apparatus, comprising
   a luminance detection step of detecting luminance of an object;
   an automatic exposure control step of changing at least one of exposure parameters based on a luminance amount detected in the luminance detection step; and
   a luminance changing amount detection step of detecting a luminance changing amount based on luminance amount detected at the luminance detection step,
   wherein in the automatic exposure control step, a change of the exposure parameters is inhibited when the luminance changing amount detected in the luminance changing amount detection step exceeds a preset luminance changing amount and the inhibition of change of the exposure parameters is released when a predetermined time passes after the inhibition of change of the exposure parameters starts.

* * * * *